(12) United States Patent
Melody et al.

(10) Patent No.: US 10,885,001 B2
(45) Date of Patent: Jan. 5, 2021

(54) SYSTEM AND METHOD FOR ASSIGNING DATA TO COLUMNAR STORAGE IN AN ONLINE TRANSACTIONAL SYSTEM

(71) Applicant: International Business Machines Corporation, Armonk, NY (US)

(72) Inventors: Eugene Melody, Dunboyne (IE); Robert Mooney, Kildare (IE)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 13/743,663

(22) Filed: Jan. 17, 2013

(65) Prior Publication Data

US 2014/0201130 A1 Jul. 17, 2014

(51) Int. Cl.
*G06F 16/21* (2019.01)
*G06F 16/22* (2019.01)

(52) U.S. Cl.
CPC .......... *G06F 16/217* (2019.01); *G06F 16/221* (2019.01)

(58) Field of Classification Search
CPC ............. G06F 17/30315; G06F 16/217; G06F 16/221; G06F 16/283; G06F 16/2365; G06F 16/23; G06F 16/24553; G06F 16/213; G06F 16/22; G06F 16/27; G06F 16/9024
See application file for complete search history.

(56) References Cited

U.S. PATENT DOCUMENTS

| 5,666,337 A | 9/1997 | Dang et al. |
| 10,296,508 B2 * | 5/2019 | Herbst .............. G06F 16/24561 |
| 2003/0154216 A1 * | 8/2003 | Arnold .................. G06F 16/211 |
| 2005/0114841 A1 | 5/2005 | Moskowitz et al. |
| 2008/0033914 A1 * | 2/2008 | Cherniack ......... G06F 17/30457 |
| 2008/0120301 A1 | 5/2008 | Pomerantz |

(Continued)

FOREIGN PATENT DOCUMENTS

| WO | 2011/126995 | 10/2011 |
| WO | 2012/032184 | 3/2012 |

OTHER PUBLICATIONS

Graefe, G., "Efficient columar storage in B-trees". Hewlett-Packard Laboratories, Palo Alto, CA, 4 pages, http://sigmod.acm.org/publications/sigmod-record/0703/03.article-graefe.pdf.

(Continued)

*Primary Examiner* — Angelica Ruiz
(74) *Attorney, Agent, or Firm* — John Noh (57) ABSTRACT

A method, apparatus, and computer program product for assigning data to columnar storage is disclosed. In one aspect of the invention, a computer implemented method is provided comprising analyzing, on one or more computers, a database stored in a storage system accessible from the one or more computers. The method also comprises determining, on one or more computers, one or more database elements from the database to be assigned to a columnar storage in the database and assigning, on one or more computers, the one or more database elements to the columnar storage in the database. The one or more database elements to be assigned to the columnar storage is determined based on at least one of a table dimension, entity relationship, compatibility with a specified schema structure, relational data structure of the database, access statistics of the database element or incoming query workload of the database element.

20 Claims, 7 Drawing Sheets

(56) References Cited

U.S. PATENT DOCUMENTS

| | | |
|---|---|---|
| 2008/0281784 A1 | 11/2008 | Zane et al. |
| 2010/0235335 A1 | 9/2010 | Heman et al. |
| 2011/0161555 A1* | 6/2011 | Olds .................. G06F 12/0866 711/103 |
| 2011/0219020 A1* | 9/2011 | Oks et al. .................... 707/769 |
| 2011/0264667 A1 | 10/2011 | Harizopoulos et al. |
| 2011/0314027 A1 | 12/2011 | Xu et al. |
| 2012/0005190 A1* | 1/2012 | Faerber ............ G06F 17/30404 707/718 |
| 2012/0054225 A1 | 3/2012 | Marwah et al. |
| 2012/0109936 A1* | 5/2012 | Zhang .............. G06F 17/30312 707/713 |
| 2012/0173515 A1* | 7/2012 | Jeong ............... G06F 17/30569 707/718 |
| 2012/0296883 A1* | 11/2012 | Ganesh et al. ............... 707/693 |
| 2013/0166553 A1* | 6/2013 | Yoon ................ G06F 17/30312 707/737 |
| 2013/0262409 A1* | 10/2013 | Amit .................... G06F 3/0608 707/693 |
| 2014/0012881 A1* | 1/2014 | Roesch et al. ................ 707/792 |
| 2014/0172780 A1* | 6/2014 | Senart et al. ................. 707/605 |
| 2014/0172788 A1* | 6/2014 | Haase et al. ................. 707/610 |
| 2014/0172827 A1* | 6/2014 | Nos et al. .................... 707/722 |

OTHER PUBLICATIONS

Stonebraker et al., "C-Store: A Column-oriented DBMS". Proceedings of the 31st VLDB Conference, Trondheim, Norway, 2005, 12 pages, http://db.lcs.mit.edu/projects/cstore/vldb.pdf.

Oracle Exadata: "Hybrid Columnar Compression (HCC) on Exadata". An Oracle White Paper, Oct. 2011, 11 pages.

* cited by examiner

SYSTEM AND METHOD FOR ASSIGNING DATA TO COLUMNAR STORAGE IN AN ONLINE TRANSACTIONAL SYSTEM

BACKGROUND OF THE INVENTION

The present invention relates generally to systems and methods for assigning data to storage, and in particular, to systems and methods for detecting and assigning database elements to be placed in columnar storage.

SUMMARY OF THE INVENTION

The invention provided herein has a number of embodiments useful, for example, in detecting and assigning database elements (e.g. database, schemas, tables) to be placed in columnar storage. According to one or more embodiments of the present invention, a method, apparatus, and computer program product are provided for assigning data to columnar storage in one or more computers.

In one aspect of the present invention, a computer implemented method is provided for assigning data to columnar storage. The method comprises analyzing, on one or more computers, a database stored in a storage system accessible from the one or more computers. The method also comprises determining, on one or more computers, one or more database elements from the database to be assigned to a columnar storage in the database and assigning, on one or more computers, the one or more database elements to the columnar storage in the database. The one or more database elements to be assigned to the columnar storage is determined based on at least one of a table dimension, entity relationship, compatibility with a specified schema structure, and relational data structure of the database. Furthermore, the one or more database elements are assigned either automatically or manually to the columnar storage. In one embodiment of the invention, the computer implemented method comprises generating a report for presentation to a user for manually assigning, on one or more computers, the one or more database elements to the columnar storage.

In another embodiment of the invention, the computer implemented method further comprises creating, on one or more computers, access statistics of the one or more database elements or an incoming query workload of the one or more database elements. The access statistics of the one or more database elements or the incoming query workload of the one or more database elements is stored, on one or more computers, in a statistics cache accessible from the one or more computers. Furthermore, the one or more database elements to be assigned to the columnar storage is determined based on the access statistics of the one or more database elements or the incoming query workload of the one or more database elements.

BRIEF DESCRIPTION OF THE DRAWINGS

Referring now to the drawings in which like reference numbers represent corresponding parts throughout.

DETAILED DESCRIPTION OF THE INVENTION

In the following description, reference is made to the accompanying drawings which form a part hereof, and in which is shown by way of illustration one or more specific embodiments in which the invention may be practiced. It is to be understood that other embodiments may be utilized and structural and functional changes may be made without departing from the scope of the present invention.

Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
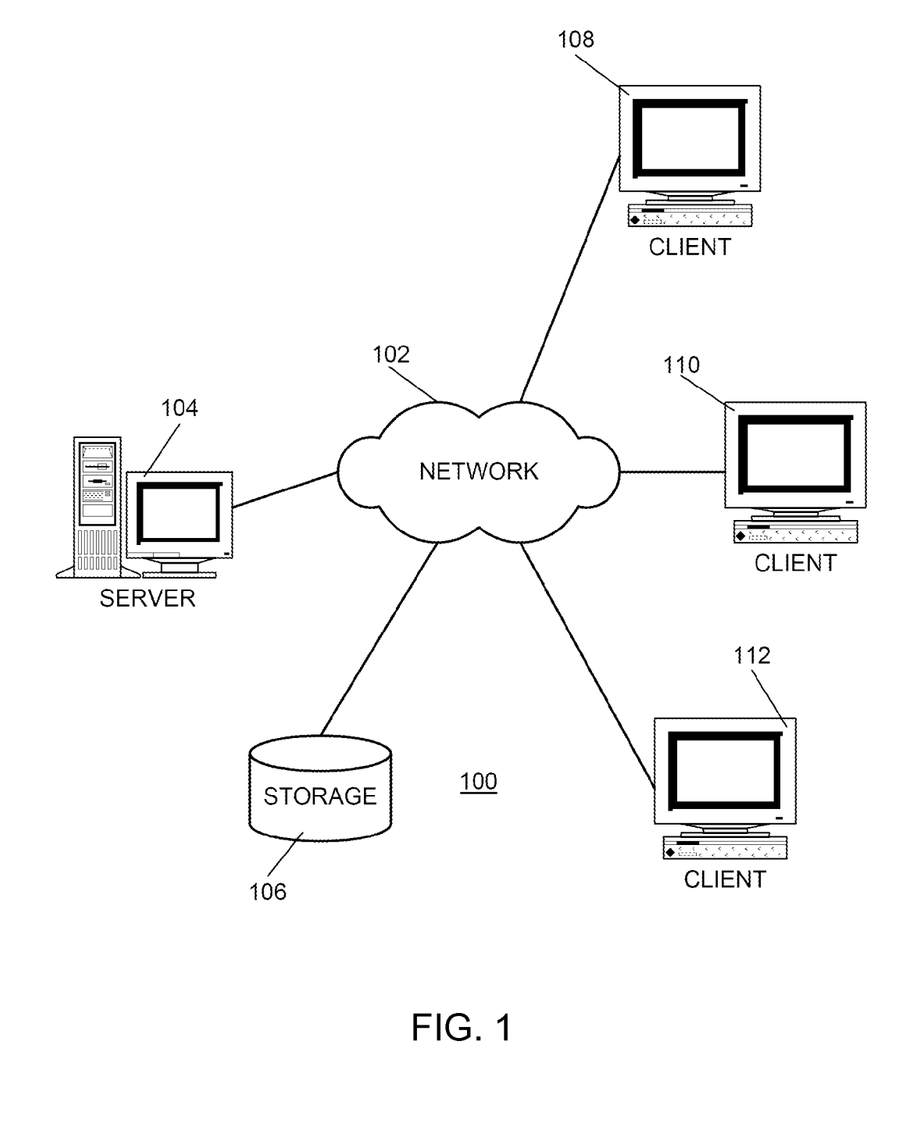
FIG. 1 is a diagram illustrating an exemplary network data processing system that can be used to implement elements of the present invention.

With reference now to FIG. 1, a pictorial representation of a network data processing system 100 is presented in which the present invention may be implemented. Network data processing system 100 contains a network 102, which is the medium used to provide communications links between various devices and computers connected together within network data processing system 100. Network 102 may include connections, such as wire, wireless communication links, or fiber optic cables etc.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and programs to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another.

Figure 2:
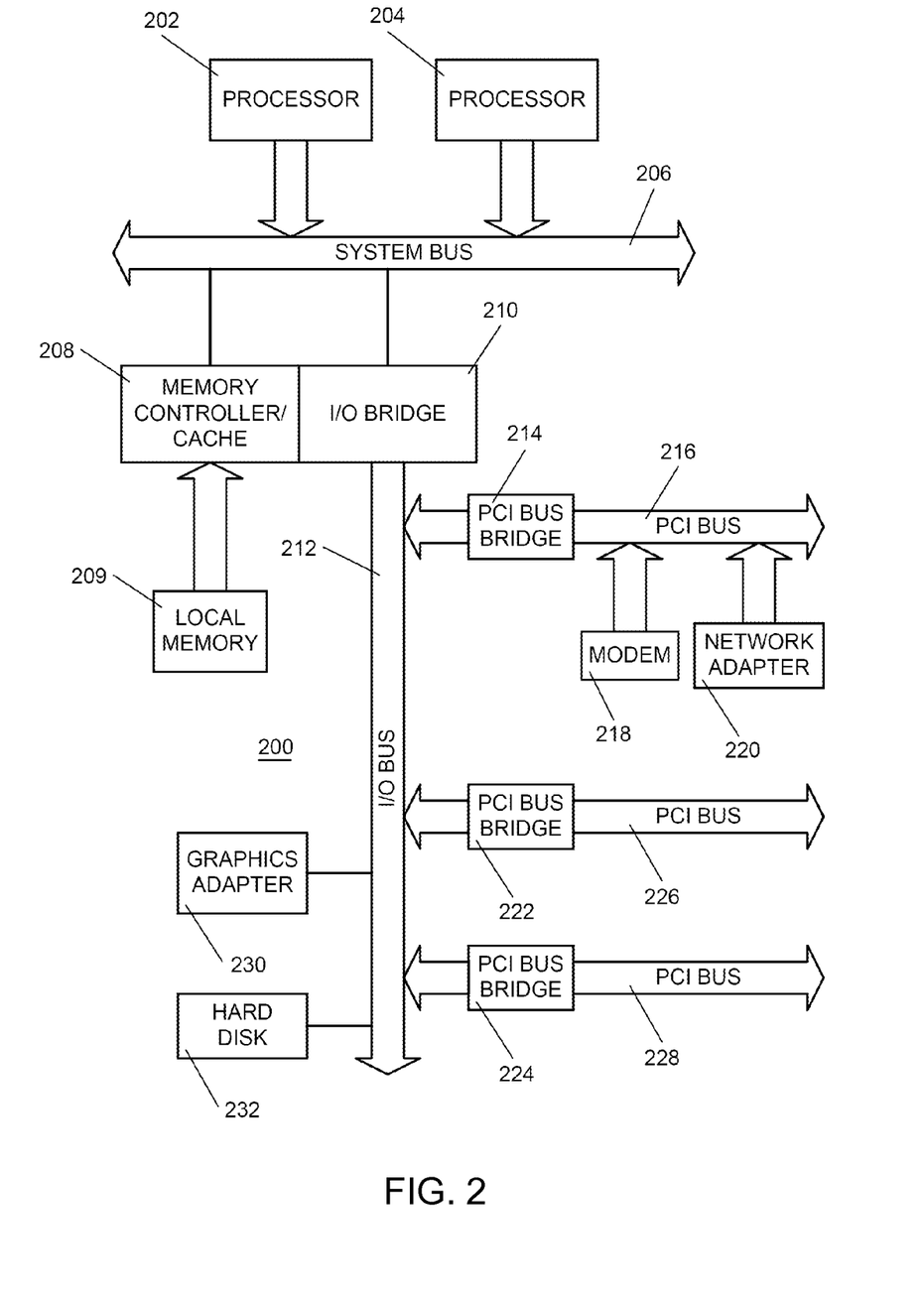
FIG. 2 is a diagram illustrating an exemplary data processing system that can be used to implement elements of the present invention.

Referring to FIG. 2, a block diagram of a data processing system that may be implemented as a server, such as server 104 in FIG. 1, is depicted in accordance with an embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Server 104 may provide a suitable website or other internet-based graphical user interface accessible by users to enable user interaction for aspects of an embodiment of the present invention. In one embodiment, Netscape web server, IBM Websphere Internet tools suite, an IBM DB2 for Linux, Unix and Windows (also referred to as "IBM DB2 for LUW") platform and a Sybase database platform are used in conjunction with a Sun Solaris operating system platform. Additionally, components such as JBDC drivers, IBM connection pooling and IBM MQ series connection methods may be used to provide data access to several sources. The term webpage as it is used herein is not meant to limit the type of documents and programs that might be used to interact with the user. For example, a typical website might include, in addition to standard HTML documents, various forms, Java applets, JavaScript, active server pages (ASP), Java Server Pages (JSP), common gateway interface scripts (CGI), extensible markup language (XML), dynamic HTML, cascading style sheets (CSS), helper programs, plug-ins, and the like.

Figure 3:
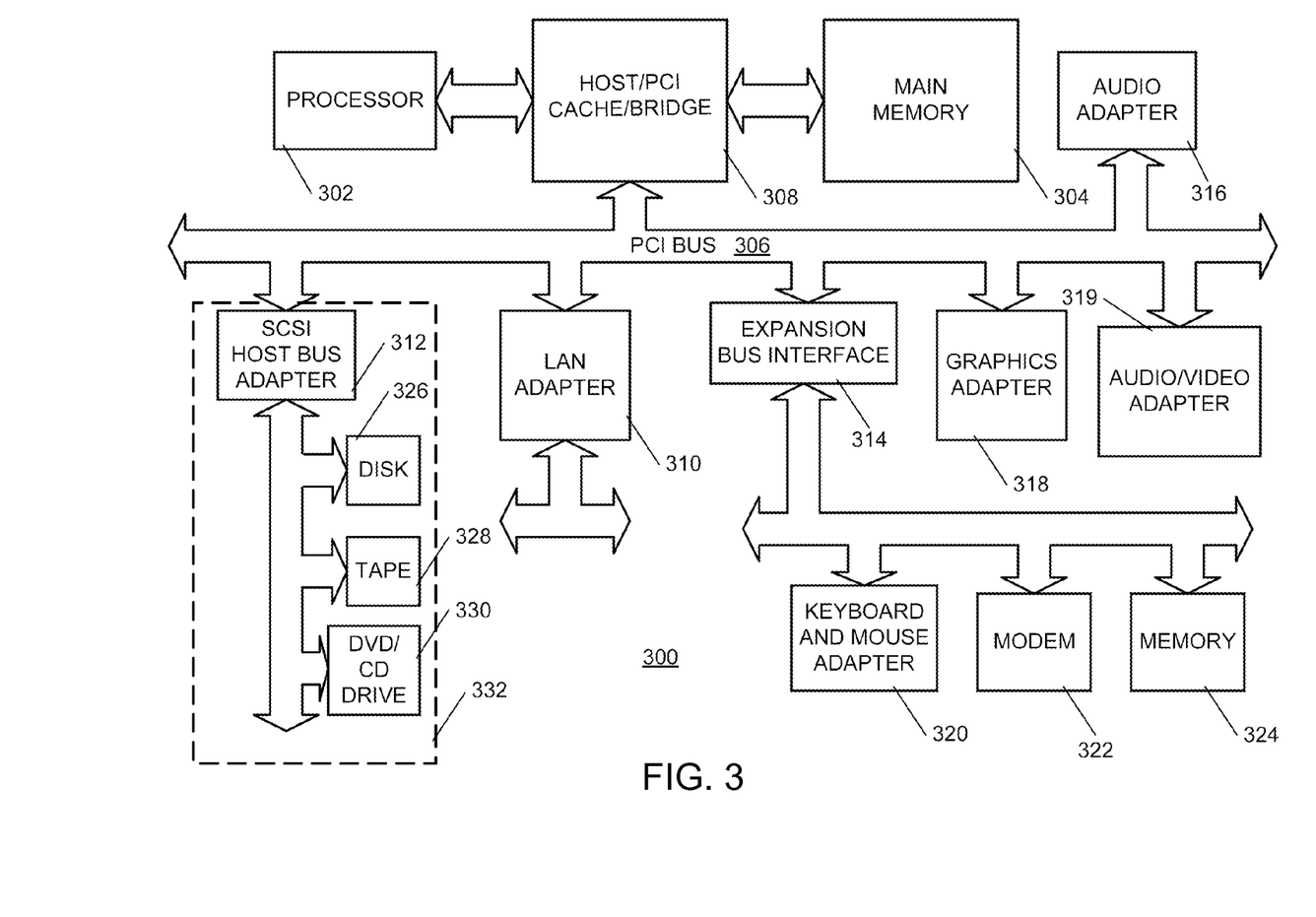
FIG. 3 is a diagram illustrating an exemplary data processing system that can be used to implement elements of the present invention.

With reference now to FIG. 3, a block diagram illustrating a data processing system is depicted in which aspects of an embodiment of the invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP®, which is available from Microsoft Corporation. An object oriented programming system such as Java may run in conjunction with the operating system and provide calls to the operating system from Java programs or programs executing on data processing system 300. "Java" is a trademark of Sun Microsystems, Inc. Instructions for the operating system, the object-oriented operating system, and programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer as well as a PDA. Further, data processing system 300 may also be a kiosk or a Web appliance. Further, the present invention may reside on any data storage medium (i.e., floppy disk, compact disk, hard disk, tape, ROM, RAM, etc.) used by a computer system. (The terms "computer," "system," "computer system," and "data processing system" and are used interchangeably herein.)

Those skilled in the art will recognize many modifications may be made to this configuration without departing from the scope of the present invention. Specifically, those skilled in the art will recognize that any combination of the above components, or any number of different components, including computer programs, peripherals, and other devices, may be used to implement the present invention, so long as similar functions are performed thereby.

For example, any type of computer, such as a mainframe, minicomputer, or personal computer, could be used with and for embodiments of the present invention. In addition, many types of applications other than caching applications could benefit from the present invention. Specifically, any application that performs remote access may benefit from the present invention.

Assigning Data to Columnar Storage

Figure 4:
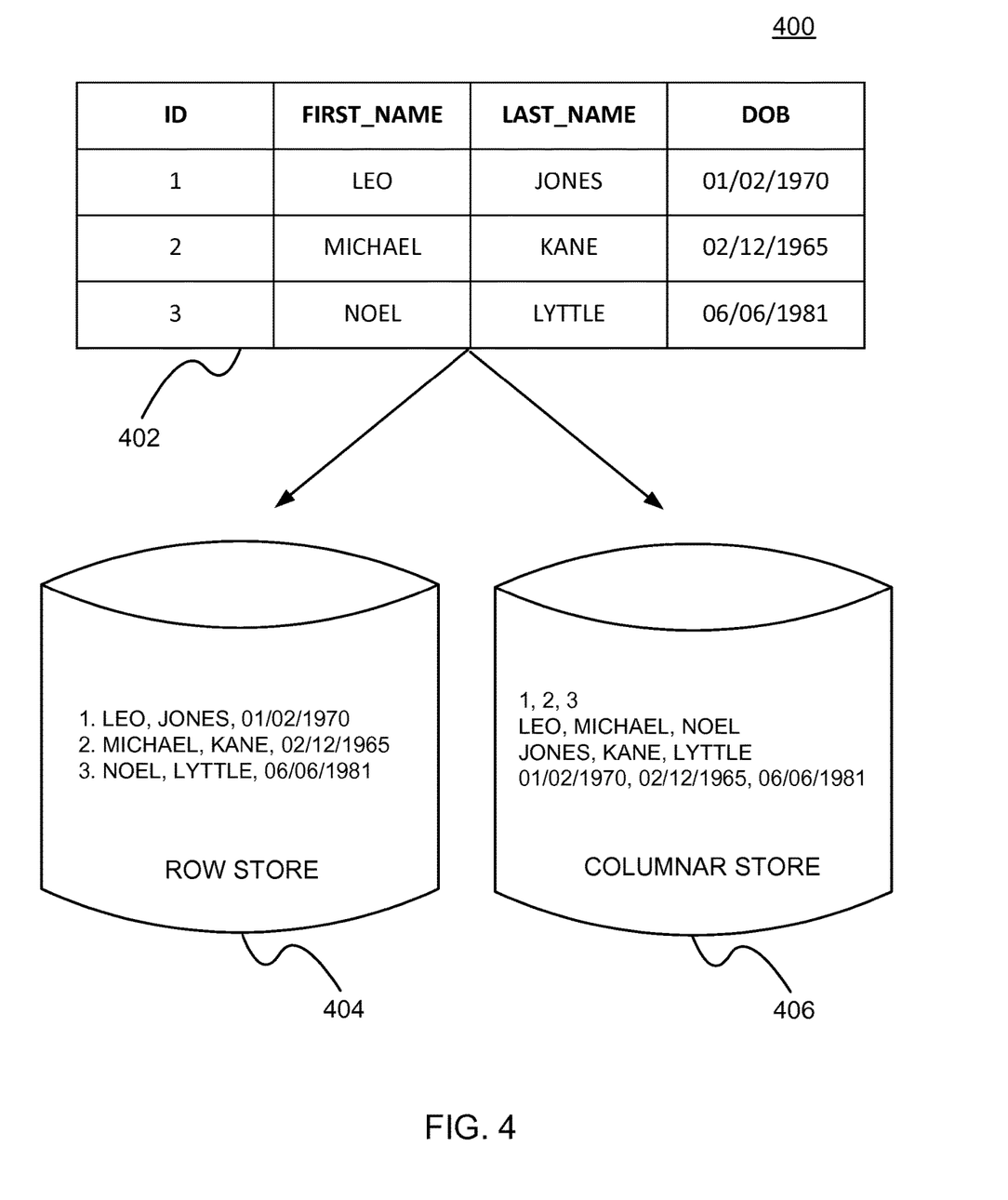
FIG. 4 is a diagram illustrating exemplary storage architecture for both row and columnar storage.

FIG. 4 is an exemplary illustration of the difference between a row store 404 and column store 406 for a single table 402 comprising data 400. Within a database management system (DBMS) performed by a computer (e.g. online transactional processing (OLTP) systems), data 400 are typically stored in row order format. In this particular example, row store 404 stores rows or tuples representing sets of four data elements (e.g. "1", "LEO", "JONES", and "01/02/1970").

However, in environments and scenarios where the query workload is analytical in nature (such as long-running, read-based queries involving data aggregation) columnar storage may be used instead to provide higher query performance and compression improvement. Columnar storage allows contiguous type-consistent storage, which regulates offset calculation when performing aggregation-based queries. As shown in FIG. 4, columnar store 406 stores columns or attributes that represent sets of data elements of a particular type (e.g. "LEO", "MICHAEL", and "NOEL" for FIRST_NAME).

Database resources (e.g. storage, performance) may be optimized through the assignment of database elements to either row or columnar storage. From a DBMS administration perspective, in addition to generic administration tools, there are also specific tools for query tuning, data and schema administration, utility scheduling, etc. Embodiments of the present invention provide a schema editing tool which allows the specification of a table, set of tables, schema or set of schemas to be assigned as storage in a columnar store.

Figure 5:
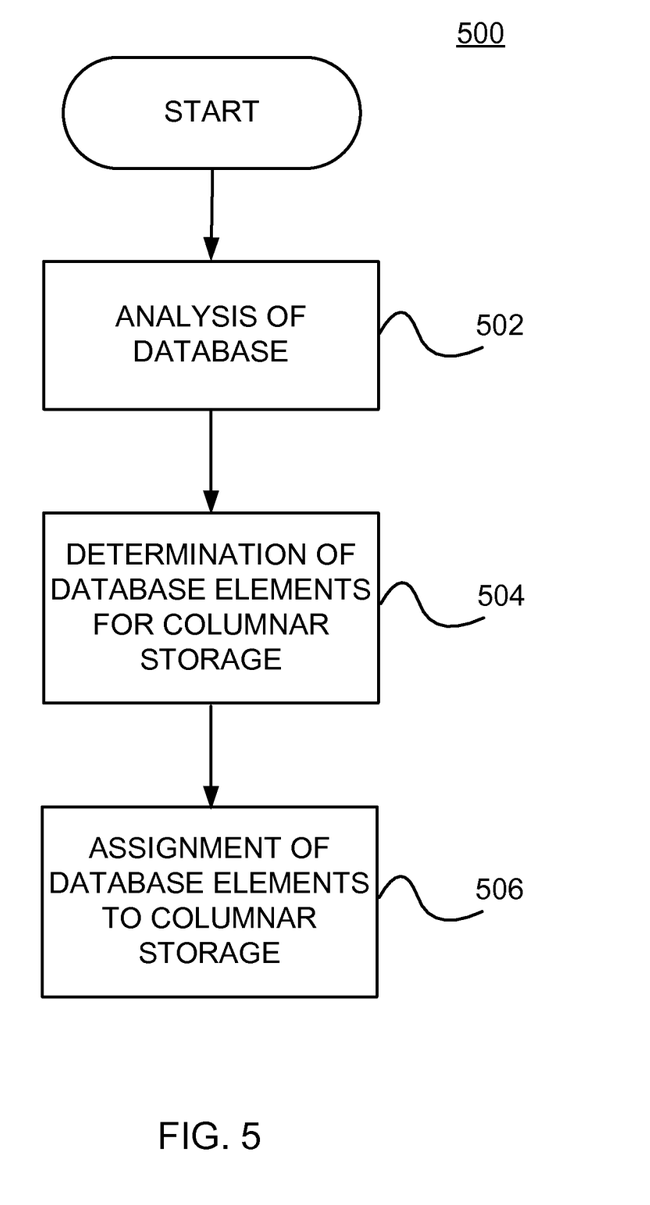
FIG. 5 is a diagram illustrating exemplary process steps that can be used to practice at least one embodiment of the present invention.

FIG. 5 is a flow chart illustrating exemplary process steps that can be used to practice one or more embodiments of the present invention. A computer implemented method 500 is provided for assigning data to columnar storage.

In block 502, a database is analyzed on one or more computers. The database is stored in a storage system accessible from the one or more computers and may be located either locally or remotely to the one or more computers. In one embodiment, the storage system is a hybrid storage system which supports both row and columnar storage.

In block 504, one or more database elements from the database are determined, on one or more computers, to be assigned to columnar storage. A database element includes, but is not limited to, a database, schema, table, field or value. In at least one embodiment of the invention, the computer implemented method further comprises creating, on one or more computers, access statistics of a database element and/or an incoming query workload of the database element. The access statistics of the database element and/or the incoming query workload are stored, on one or more computers, in a statistics cache accessible from the one or more computers. Furthermore, determination of the one or more database elements to be assigned to the columnar storage in the database is based on the table dimension, entity relationship, compatibility with a specified schema structure, relational data structure of the database, access statistics of the database element, and/or incoming query workload of the database element.

In at least one embodiment of the present invention, the incoming query workload contains information regarding the frequency of queries to read the database element, queries to write to the database element, and/or queries to rewrite over the database element. In an exemplary implementation, the database element is assigned to a columnar storage when the frequency of queries to read the database element is greater than the frequency of queries to write to the database element and queries to rewrite over the database element.

In another exemplary implementation, the database element is assigned to a columnar storage when the relational data structure of the database is a warehousing-type relationship. A warehousing-type relationship may be a star schema structure or a snowflake schema structure.

In block 506, the one or more database elements from the database are assigned, on one or more computers, to the columnar storage. The one or more database elements may be assigned either automatically or manually to the columnar storage. In at least one embodiment, the DBMS contains or is related to a process that provides automatic analysis and relocation of tables to columnar storage. In at least another embodiment performed by a computer, the computer implemented method comprises generating a report for presentation to a user, wherein the report may be used by the user for manually assigning, on one or more computers, the one or more database elements to the columnar storage.

Using an Administration Tool to Assign a Database Element to Columnar or Row Storage In one aspect of the present invention, an Administration tool performed by a computer is provided as a functional extension of the database administration or configuration tool/application provided herein. The Administration tool may be located remotely or locally to the DBMS.

In at least one embodiment, the Administration tool assigns database elements, such as databases, schemas, and tables, to either columnar or row storage. In certain embodiments, the Administration tool interacts with a graphical or tabular presentation of the data in an underlying DBMS. In other embodiments, the Administration tool displays the entity relationships between tables in a DBMS and allows the database elements displayed within the Administration tool to be assigned to either columnar or row storage. This assignment may be performed automatically by the Administration tool, which acts in accordance to a feed received from the Storage Optimizer/Advisor, or manually by a user/database administrator (DBA). In further embodiments, this assignment is used by a DBMS input/output (I/O) process (for row and/or columnar serialization) to decide which storage semantics are to be used when writing database elements to a storage subsystem. Additionally, the Administration tool interacts with the DBMS I/O in determining which storage subsystem is to be used for storing the database elements, for example deciding whether to write to a solid state drive (SSD) or a hard disk drive (HDD).

In at least another embodiment, the Administration tool analyzes a database or schema and suggests what elements of the database should be moved to columnar storage. Candidate database elements for columnar storage may be identified based on the table dimension, entity relationship between tables in the database, compatibility with a specified schema structure and/or relational data structure of the database. In one exemplary implementation, the Administration tool looks for star or snowflake schemas in the table relationships and flags matching relationships as columnar storage candidates (e.g. if star/snowflake schema then columnar; else row storage). Columnar storage candidates can be accepted as such and be set for columnar serialization in a storage subsystem. Any database element (e.g. database, schema, table) can be toggled between row and columnar storage by the Administration tool so that data can be tuned by the user according to any storage or service level criteria.

Figure 6:
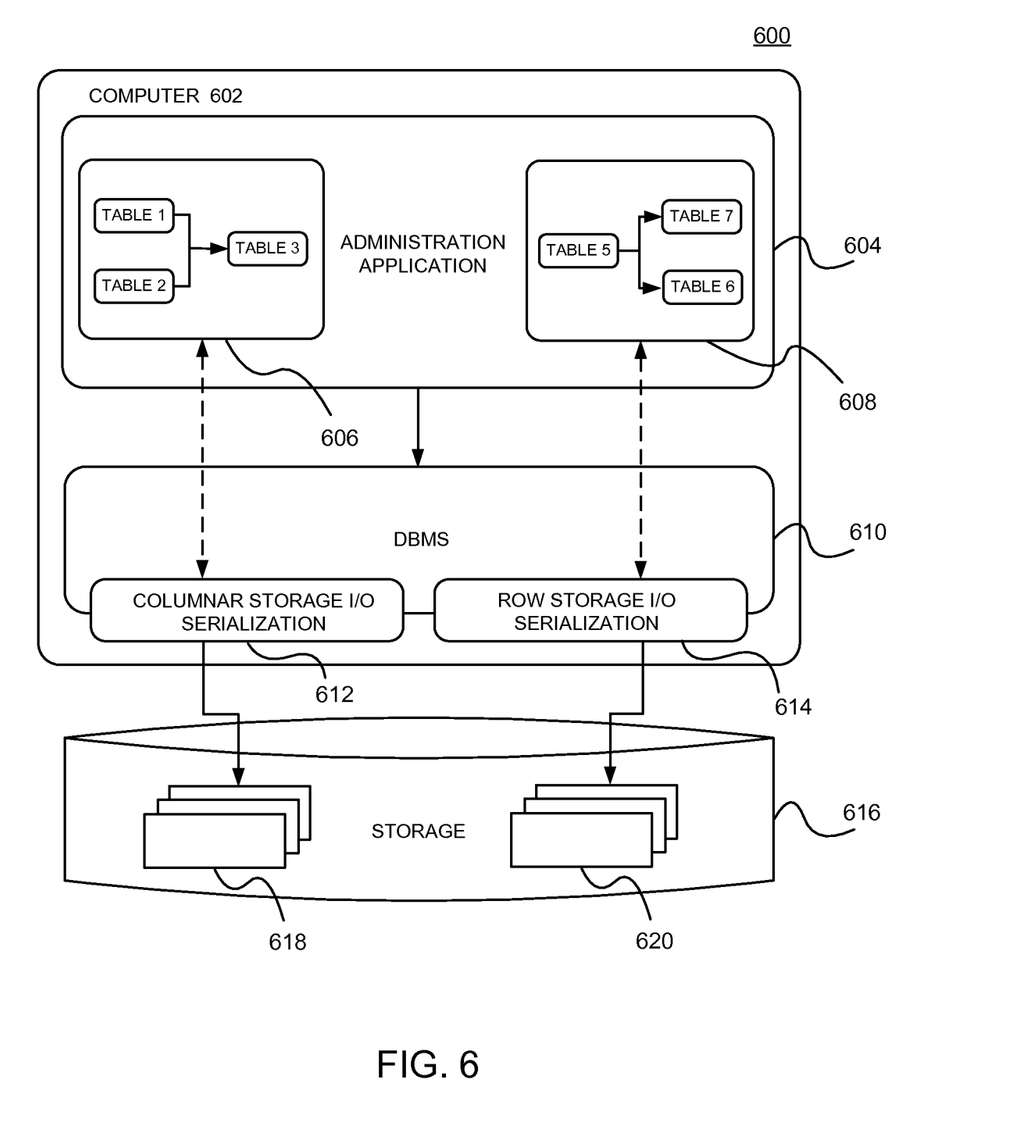
FIG. 6 is a diagram illustrating an exemplary database administration/configuration system, according to at least one embodiment of the present invention.

FIG. 6 is a diagram illustrating an exemplary database administration/configuration system 600. Within computer 602 are modules for an Administration application/tool 604 and a database management system (DBMS) 610. Exemplary database/table relationships 606 and 608 are analyzed by the Administration tool 604. Table relationship 606 has been determined by the Administration tool 604 to be assigned to columnar storage and through a DBMS I/O process for columnar serialization 612, table relationship 606 is stored in a storage system 616 as a columnar store 618. Additionally, table relationship 608 has been determined by the Administration tool 604 to be assigned to row storage and through a DBMS I/O process for row serialization 614, table relationship 608 is stored in the storage system 616 as a row store 618.

Using a Storage Optimizer/Advisor to Assign a Database Element to Columnar or Row Storage In another aspect of the present invention, a Storage Optimizer/Advisor is provided. The Storage Optimizer/Advisor is a DBMS or similar process performed by a computer that is provided as a functional extension to a DBMS engine. The Storage Optimizer/Advisor collects and utilizes live access and/or workload statistics to determine whether a database element should be columnar or row stored. The Storage Optimizer/Advisor may be internal or external to the DBMS.

In at least one embodiment, the Storage Optimizer/Advisor uses a statistics cache, accessible from one or more computers, to determine whether a database element should be columnar or row stored. The statistics cache comprises access statistics of a database element and an incoming query workload of the database element. The data in the statistics cache is obtained by monitoring the incoming query workload and creating records describing the category of workload and access statistics of an accessed database element.

In one embodiment, the incoming read workload, write workload, and rewrite (R/W) workload are collected against the database elements. The incoming query workload includes the frequency of queries to read the database element, queries to write to the database element, and/or queries to rewrite over the database element. In an exemplary implementation, the database element is assigned to a columnar storage when the frequency of queries to read the database element is greater than the frequency of queries to write to the database element and queries to rewrite over the database element. Generally, a read workload involving aggregation is best fulfilled by columnar storage where aggregation operations are relatively cheap in performance terms. Database elements that are predominantly associated with read workloads are therefore candidates for columnar storage. Conversely, database elements which are already associated with a columnar store and are receiving write or R/W workload over a prolonged period are natural candidates for row based storage where workloads, such as Insert, Update or Delete-type workloads, are relatively cheap in performance terms. However, it is to be noted that this is only one exemplary implementation and the determination of candidates for columnar or row storage by the Storage Optimizer/Advisor may be based on any criteria desired by the user or database administrator (e.g. database elements predominantly associated with read workloads are set as candidates for row storage instead).

In at least another embodiment, the Storage Optimizer/Advisor uses the relational data structure of the database to determine whether a database element should be columnar or row stored. The relational data structure contains the run-time or catalog definition (table relationships or schemas) of the database elements and provides information for the Storage Optimizer/Advisor to determine which database elements are to be nominated into either columnar or row store. After making the determination, the Storage Optimizer/Advisor is able to provide a feed to the Administration tool which acts accordingly and automatically assigns database elements to either columnar or row storage. In one embodiment, the relational structures are used in isolation so that the DBMS process can analyze the schema and table relationships to identify warehousing type relationships and nominate such tables for columnar storage. In an exemplary implementation, the DBMS process looks for star or snowflake schemas in the table relationships and flags matching relationships as columnar storage candidates (e.g. if star/snowflake schema then columnar; else row storage).

In at least a further embodiment, the Storage Optimizer/Advisor takes input from both the statistics cache and the relational data structure to determine whether a database element should be columnar or row stored. The Storage Optimizer/Advisor can be configured to make automatic columnar or row storage alterations/assignments to database elements which are columnar or row store candidates. Additionally, database elements can be monitored and autonomically assigned to either columnar or row storage based on access statistics for resource (e.g. storage, performance) optimization. Alternatively, where autonomic execution is not required, the Storage Optimizer/Advisor process can output human-readable advice reports which may be used by a database administrator/user as a basis to manually configure the DBMS storage assignment.

Figure 7:
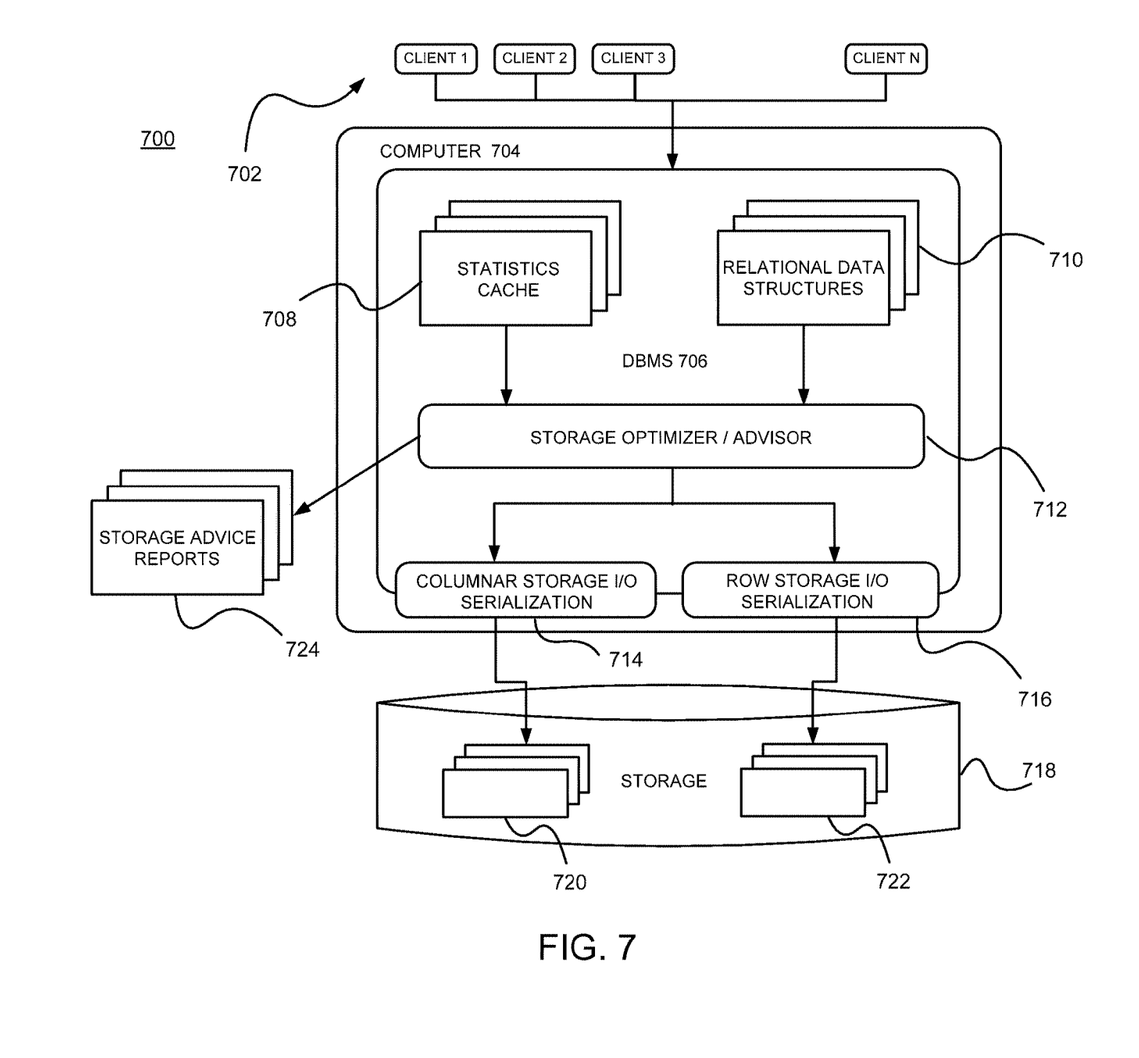
FIG. 7 is a diagram illustrating an exemplary storage advisor/optimizer system, according to at least one embodiment of the present invention.

FIG. 7 is a diagram illustrating an exemplary Storage Optimizer/Advisor system 700, according to at least one embodiment of the present invention. Multiple clients/users 702 submit database queries to a computer 704. Within computer 704 are modules for a database management system (DBMS) 706 and a Storage Optimizer/Advisor 712. The incoming query workload is stored in a statistics cache 708. The Storage Optimizer/Advisor 712 obtains information from both the statistics cache 708 and the relational data structures 710, and makes a determination on which database elements should be columnar or row stored. The Storage Optimizer/Advisor may output storage advice reports 724 which provide suggestions to a user on which database elements are suitable candidates for columnar or row storage. Additionally, the DBMS may also perform columnar storage I/O serialization 714 and row storage I/O serialization 716 on the database elements, which stores the database elements in a storage system 718 as a columnar store 720 and row store 722, respectively.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method for assigning data to columnar storage, comprising:

analyzing, on one or more computers, a database stored in a storage system accessible from the one or more computers;

assigning, on one or more computers, one or more database elements from the database to a format comprising a columnar or row storage in the database based on an optimizer's determination of access statistics of a workload of an incoming query of the one or more database elements, wherein the one or more database elements can be toggled between the columnar and row storage in the database, wherein the access statistics is one of a read, a write, or a rewrite of a corresponding one of the one or more database elements, the optimizer's determination being indicative of a comparison between a first frequency of the database element being read relative to a second frequency of the database element being written and rewritten, the first frequency being greater than the second frequency being indicative of writing the one or more database elements to the columnar storage, the second frequency being greater than the first frequency being indicative of writing the one or more database elements to the row storage; and writing, on one or more computers, the one or more database elements to the columnar or row storage in the database as assigned.

2. The computer implemented method of claim 1, wherein the one or more database elements is assigned automatically or manually to the columnar or row storage.

3. The computer implemented method of claim 1, wherein the one or more database elements is assigned to the columnar or row storage based on at least one of a table dimension, entity relationship between tables, or compatibility with a specified schema structure and relational data structure of the database when the relational data structure of the database is a warehousing-type relationship and the specified schema structure is one of a star schema structure and a snowflake schema structure.

4. The computer implemented method of claim 2, further comprising generating a report for presentation to a user for manually assigning, on one or more computers, the one or more database elements to the columnar or row storage.

5. The computer implemented method of claim 1, further comprising:

creating, on one or more computers, access statistics of the workload of the incoming query of the one or more database elements;

determining, on one or more computers, one or more database elements from the database to be assigned to a columnar or row storage in the database based on the access statistics of the workload of the incoming query of the one or more database elements; and storing, on one or more computers, the access statistics of the workload of the incoming query of the one or more database elements in a statistics cache accessible from the one or more computers.

6. The computer implemented method of claim 1, wherein the workload of the incoming query is a frequency of at least one of a query to read the database element, a query to write to the database element, or a query to rewrite over the database element.

7. The computer implemented method of claim 6, wherein the one or more database elements is assigned to the columnar storage when the frequency of a query to read the database element is greater than the frequency of a query to write to the database element and the frequency of a query to rewrite over the database element.

8. A computer implemented apparatus for assigning data to columnar storage, comprising:

one or more computers; and one or more processes performed by the one or more computers, the processes configured to:

analyze, on one or more computers, a database stored in a storage system accessible from the one or more computers;

assign, on one or more computers, one or more database elements from the database to a format comprising a columnar or row storage in the database based on an optimizer's determination of access statistics of a workload of an incoming query of the one or more database elements, wherein the one or more database elements can be toggled between the columnar and row storage in the database, wherein the access statistics is one of a read, a write, or a rewrite of a corresponding one of the one or more database elements, the optimizer's determination being indicative of a comparison between a first frequency of the database element being read relative to a second frequency of the database element being written and rewritten, the first frequency being greater than the second frequency being indicative of writing the one or more database elements to the columnar storage, the second frequency being greater than the first frequency being indicative of writing the one or more database elements to the row storage; and write, on one or more computers, the one or more database elements to the columnar or row storage in the database as assigned.

9. The apparatus of claim 8, wherein the one or more database elements is assigned automatically or manually to the columnar or row storage.

10. The apparatus of claim 8, wherein the one or more database elements is assigned to the columnar or row storage based on at least one of a table dimension, entity relationship between tables, or compatibility with a specified schema structure and relational data structure of the database when the relational data structure of the database is a warehousing-type relationship and the specified schema structure is one of a star schema structure and a snowflake schema structure.

11. The apparatus of claim 9, wherein the processes are further configured to generate a report for presentation to a user to manually assign, on one or more computers, the one or more database elements to the columnar or row storage.

12. The apparatus of claim 8, wherein the processes are further configured to:

create, on one or more computers, access statistics of the workload of the incoming query of the one or more database elements;

determine, on one or more computers, one or more database elements from the database to be assigned to a columnar or row storage in the database based on the access statistics of the workload of the incoming query of the one or more database elements; and store, on one or more computers, the access statistics of the workload of the incoming query of the one or more database elements in a statistics cache accessible from the one or more computers.

13. The apparatus of claim 12, wherein the workload of the incoming query is a frequency of at least one of a query to read the database element, a query to write to the database element or a query to rewrite over the database element.

14. The apparatus of claim 13, wherein the one or more database elements is assigned to the columnar storage when the frequency of a query to read the database element is greater than the frequency of a query to write to the database element and the frequency of a query to rewrite over the database element.

15. A non-transitory computer program product for assigning data to columnar storage, said computer program product comprising:

a non-transitory computer readable storage medium having stored/encoded thereon:

first program instructions executable by a computer to cause the computer to analyze, on one or more computers, a database stored in a storage system accessible from the one or more computers;

second program instructions executable by the computer to cause the computer to assign, on one or more computers, one or more database elements from the database to a format comprising a columnar or row storage in the database based on an optimizer's determination of access statistics of a workload of an incoming query of the one or more database elements, wherein the one or more database elements can be toggled between the columnar and row storage in the database, wherein the access statistics is one of a read, a write, or a rewrite of a corresponding one of the one or more database elements, the optimizer's determination being indicative of a comparison between a first frequency of the database element being read relative to a second frequency of the database element being written and rewritten, the first frequency being greater than the second frequency being indicative of writing the one or more database elements to the columnar storage, the second frequency being greater than the first frequency being indicative of writing the one or more database elements to the row storage; and third program instructions executable by the computer to cause the computer to write, on one or more computers, the one or more database elements to the columnar or row storage in the database as assigned.

16. The computer program product of claim 15, wherein the one or more database elements is assigned automatically or manually to the columnar or row storage.

17. The computer program product of claim 15, wherein the one or more database elements is assigned to a columnar or row storage based on at least one of a table dimension, entity relationship between the tables, or compatibility with a specified schema structure and relational data structure of the database when the relational data structure of the database is a warehousing-type relationship and the specified schema structure is one of a star schema structure and a snowflake schema structure.

18. The computer program product of claim 15, further comprising:
fourth program instructions executable by the computer to cause the computer to create on one or more computers, access statistics of the one or more database elements or the workload of the incoming query of the one or more database elements;
fifth program instructions executable by the computer to cause the computer to determine, on one or more computers, one or more database elements from the database to be assigned to a columnar or row storage in the database based on the access statistics of the workload of the incoming query of the one or more database elements; and
sixth program instructions executable by the computer to cause the computer to store, on one or more computers, the access statistics of the workload of the incoming query of the one or more database elements in a statistics cache accessible from the one or more computers.

19. The computer program product of claim 18, wherein the workload of the incoming query is a frequency of at least one of a query to read the database element, a query to write to the database element or a query to rewrite over the database element.

20. The computer program product of claim 19, wherein the one or more database elements is assigned to the columnar storage when the frequency of a query to read the database element is greater than the frequency of a query to write to the database element and the frequency of a query to rewrite over the database element.

* * * * *